US011561823B1

(12) United States Patent
Loganathan et al.

(10) Patent No.: US 11,561,823 B1
(45) Date of Patent: Jan. 24, 2023

(54) LOCKLESS MANAGEMENT OF IMMUTABLE OBJECTS BY MULTI-THREADED PROCESSES USING MULTIPLE COUNTERS

(71) Applicant: Juniper Networks, Inc., Sunnyvale, CA (US)

(72) Inventors: Jaihari V. Loganathan, Cupertino, CA (US); Ashutosh K. Grewal, Sunnyvale, CA (US); Sanjay Khanna, Cary, NC (US)

(73) Assignee: Juniper Networks, Inc., Sunnyvale, CA (US)

( * ) Notice: Subject to any disclaimer, the term of this patent is extended or adjusted under 35 U.S.C. 154(b) by 35 days.

(21) Appl. No.: 15/930,171

(22) Filed: May 12, 2020

(51) Int. Cl.
*G06F 9/46* (2006.01)
*G06F 9/48* (2006.01)

(52) U.S. Cl.
CPC ............ *G06F 9/4881* (2013.01); *G06F 9/467* (2013.01)

(58) Field of Classification Search
CPC .... G06F 9/4881; G06F 9/467; G06F 12/0261; G06F 12/0253
See application file for complete search history.

(56) References Cited

U.S. PATENT DOCUMENTS

| 6,392,997 B1 | 5/2002 | Chen |
| 6,938,095 B2 * | 8/2005 | Basturk ................... G06F 9/542 370/351 |

(Continued)

FOREIGN PATENT DOCUMENTS

| CN | 101741705 A | 6/2010 |
| CN | 102394809 A | 3/2012 |

(Continued)

OTHER PUBLICATIONS

Brands et al., "Parallelization of BGP for route server functionality—A protocol and implementation study," amsix Amsterdam Internet Exchange, MSc Research Project System and Network Engineering, Aug. 4, 2017, 51 pp.

(Continued)

*Primary Examiner* — Meng Ai T An
*Assistant Examiner* — Hsing Chun Lin
(74) *Attorney, Agent, or Firm* — Shumaker & Sieffert, P.A.

(57) ABSTRACT

In general, the disclosure describes techniques for lockless management of immutable objects by multi-threaded processes. A device comprising a processor may implement the techniques, where the processor execute a multi-threaded process including a producer thread and a consumer thread. The producer thread may instantiate an immutable object, and provide, to the consumer thread, a reference to the immutable object. The producer thread may also increment a reference counter to indicate that the reference has been provided to the consumer thread, where the reference counter is local to the producer thread and inaccessible to the at least two consumer threads. The producer thread may receive, from the consumer thread, a notification that the consumer thread has finished processing the immutable object, and decrement, responsive to receiving the notification, the reference counter. The producer thread may then delete, based on the reference counter, the immutable object.

16 Claims, 8 Drawing Sheets

(56) References Cited

U.S. PATENT DOCUMENTS

| | | | |
|---|---|---|---|
| 7,184,437 B1 | 2/2007 | Cole et al. | |
| 7,245,619 B1 | 7/2007 | Guan et al. | |
| 7,334,048 B1 | 2/2008 | Guan et al. | |
| 7,359,393 B1 | 4/2008 | Nalawade et al. | |
| 7,499,459 B1 * | 3/2009 | Scudder | H04L 45/02 |
| | | | 370/389 |
| 7,558,877 B1 | 7/2009 | Fedyk et al. | |
| 7,675,912 B1 | 3/2010 | Ward et al. | |
| 8,463,887 B2 * | 6/2013 | Rajan | H04L 47/32 |
| | | | 709/223 |
| 8,677,076 B2 * | 3/2014 | Dice | G06F 12/0261 |
| | | | 711/152 |
| 8,937,961 B1 | 1/2015 | Vairavakkalai | |
| 10,091,049 B2 * | 10/2018 | Giacomoni | H04L 41/00 |
| 10,296,393 B2 * | 5/2019 | Nandan | G06F 13/1663 |
| 10,621,086 B2 * | 4/2020 | Craik | G06F 12/0269 |
| 10,642,650 B2 | 5/2020 | Wang et al. | |
| 10,761,993 B2 * | 9/2020 | Li | G06F 12/0882 |
| 2003/0110289 A1 | 6/2003 | Kamboh et al. | |
| 2004/0160969 A1 | 8/2004 | Moon et al. | |
| 2005/0074003 A1 | 4/2005 | Ball et al. | |
| 2005/0135256 A1 | 6/2005 | Ball et al. | |
| 2005/0169281 A1 | 8/2005 | Ko et al. | |
| 2006/0233181 A1 | 10/2006 | Raszuk et al. | |
| 2007/0064698 A1 | 3/2007 | Appanna | |
| 2009/0182896 A1 | 7/2009 | Patterson et al. | |
| 2011/0242991 A1 | 10/2011 | Zhang et al. | |
| 2012/0063460 A1 | 3/2012 | Hallivuor | |
| 2012/0263049 A1 | 10/2012 | Venkatachalapathy et al. | |
| 2014/0075048 A1 | 3/2014 | Yuksel et al. | |
| 2015/0100730 A1 * | 4/2015 | Kandiyanallur | G06F 12/121 |
| | | | 711/159 |
| 2016/0352619 A1 | 12/2016 | Gattani | |
| 2017/0207963 A1 | 7/2017 | Mehta et al. | |
| 2018/0232304 A1 * | 8/2018 | Wang | G06F 12/0261 |
| 2019/0179668 A1 | 6/2019 | Wang et al. | |
| 2021/0067463 A1 | 3/2021 | Mukhopadhyay et al. | |
| 2021/0120109 A1 | 4/2021 | Ranpise et al. | |
| 2021/0243111 A1 | 8/2021 | Dutta | |

FOREIGN PATENT DOCUMENTS

| | | |
|---|---|---|
| CN | 102752198 A | 10/2012 |
| CN | 105812276 A | 7/2016 |
| CN | 107343302 A | 11/2017 |
| WO | 2012083704 A1 | 6/2012 |
| WO | WO-2017095367 A1 * | 6/2017 |

OTHER PUBLICATIONS

Ishida, "GoBGP: yet another OSS BGPd," NTT Software Innovation Center, RIPE-71, retrieved from https://ripe71.ripe.net/presentations/135-RIPE71_GoBGP.pdf, Nov. 2015, 26 pp.

Lei et al., "An Improved Parallel Access Technology on Routing Table for Threaded BGP," 2009 15th International Conference on Parallel and Distributed Systems, Dec. 1, 2009, 7 pp.

Ju et al., "MR-PBGP: A Multi-Root Tree Model for Parallel BGP," 2012 IEEE 14th International Conference on High Performance Computing and Communications, Jun. 25, 2012, 8 pp.

Schweizer, H. et el., "Evaluating the Cost of Atomic Operations on Modem Architectures," published by the Institute of Electrical and Electronics Engineers (IEEE) on Mar. 10, 2016, 12 pp.

U.S. Appl. No. 16/836,436, entitled "Border Gateway Protocol Update Packing for a Distributed Routing Information Base," and filed Mar. 31, 2020, Juniper Networks, Inc. (Loganathan et al.).

* cited by examiner

LOCKLESS MANAGEMENT OF IMMUTABLE OBJECTS BY MULTI-THREADED PROCESSES USING MULTIPLE COUNTERS

TECHNICAL FIELD

The invention relates to network devices and, more particularly, object management by multi-threaded processes in network devices.

BACKGROUND

Packet-based networks, such as the Internet, communicate data by dividing the data into small blocks called packets, which are individually routed across the network from a source device to a destination device. Routing devices within the network, such as routers, maintain routing information that describes routes for the network. Such devices may use the routing information to generate forwarding information, which is used by the routing devices to relay packet flows through the network and, more particularly, to relay packet flows to a next hop. When receiving an incoming packet, the router examines information within the packet to identify the destination for the packet. Based on the destination, the router forwards the packet in accordance with the forwarding information.

Computer networks, such as the Internet, may include distributed sets of routers that exchange routing information according to a defined routing protocol. Border Gateway Protocol (BGP), the Intermediate System to Intermediate System (IS-IS) Protocol, and the Open Shortest Path First (OSPF) Protocol are representative examples of defined routing protocols. When two routers initially connect, the routers exchange routing information and generate forwarding information from the exchanged routing information. Particularly, the two routers initiate a routing communication "session" via which they exchange routing information using routing protocol messages according to the defined routing protocol. The routers continue to communicate via the routing protocol to incrementally update the routing information and, in turn, update their forwarding information in accordance with changes to a topology of the network indicated in the updated routing information. For example, the routers may send update messages to advertise newly available routes or to inform other routers that some routes are no longer available.

An autonomous system (AS) is a collection of networks under a single administrative domain. Collections of interconnected autonomous systems, such as the internet, use BGP to route data packets between and within autonomous systems based on addressing information within the data packets. A routing protocol route advertisement, such as a BGP UPDATE message, may be used to advertise one or more routes for network prefixes reachable via the network.

A routing domain, such as a BGP network, may include one or more routers, route reflectors, nodes, and endpoint devices (e.g., servers, printers, and computers). Some of the routers within the routing domain may be grouped together into redundant clusters. Each router within the routing domain typically forwards data packets according to routes stored at the router and the destination address of the data packets. Route reflectors, such as BGP route reflectors, peer with other routers to receive and advertise routes but typically do not forward packets.

SUMMARY

In general, the disclosure describes techniques for lockless management of immutable objects by multi-threaded processes executed by a network device, such as a network router. A network device may, for example, execute a producer thread of the multi-threaded process that instantiates immutable objects for consumption by one or more consumer threads of the multi-threaded process (e.g., a routing protocol process) to generate routing protocol messages. As described herein, rather than the producer thread maintaining all state necessary to perform immutable object management, such as garbage collection, the multi-threaded process may utilize distributed immutable object management to facilitate concurrent execution of the threads without implementing object locks.

In one example, the producer thread maintains state data in the form of a reference counter that identifies how many times the immutable object has been provided to the consumer threads. The consumer threads maintains state data in the form of a local reference counter and a hold reference counter to facilitate immutable object management. When a given consumer thread has determined, based on the local reference counter, that the immutable object has been processed (or, in other words, no longer needed), the consumer thread may send, to the producer thread, a notification with the hold reference counter value. The producer thread then decrements the reference counter by the hold reference counter value. When the reference counter equals zero, the producer thread may delete the immutable object.

In accordance with the techniques described herein, distribution of management of state information and processing may facilitate concurrent execution of threads with potentially little degradation of the concurrent execution benefits (such as parallel or concurrent execution of threads to facilitate processing throughput). By implementing a lockless architecture, various aspects of the techniques may avoid instances where two or more concurrently executed threads attempt to access the same immutable object such that only one thread is able to access the immutable object while the remaining threads sits idle until the lock is removed. In this respect, various aspects of the techniques may enable the network device to operate more efficiently in terms of processing cycles, memory, and memory bandwidth consumed.

In one example, various aspects of the techniques are directed to a method comprising: instantiating, by a producer thread of a multi-threaded process executed by one or more processors of a computing device, an immutable object required by at least two consumer threads of the multi-threaded process; providing, by the producer thread and to a first consumer thread of the multi-threaded process, a reference to the immutable object; incrementing, by the producer thread and responsive to providing the reference to the immutable object, a reference counter to record ownership of the immutable object by the first consumer thread, wherein the reference counter is local to the producer thread and inaccessible to the at least two consumer threads; receiving, by the producer thread and from the first consumer thread, a notification that the consumer thread has finished processing the immutable object; decrementing, by the producer thread and responsive to receiving the notification, the reference counter; and deleting, by the producer thread and based on the reference counter, the immutable object.

In another example, various aspects of the techniques are directed to a device comprising: one or more processors configured to execute a multi-threaded process including a producer thread and a first consumer thread, wherein the producer thread is programmed to: instantiate an immutable object; provide, to the first consumer thread, a reference to the immutable object required by at least two consumer threads of the multi-threaded process; increment a reference counter to indicate that the reference to the immutable object has been provided to the first consumer thread, wherein the reference counter is local to the producer thread and inaccessible to the at least two consumer threads; receive, from the first consumer thread, a notification that the consumer thread has finished processing the immutable object; decrement, responsive to receiving the notification, the reference counter; and delete, based on the reference counter, the immutable object.

In another example, various aspects of the techniques are directed to a non-transitory computer-readable storage medium having stored thereon instructions that, when executed, cause one or more processors to execute a producer thread of a multi-threaded process, the producer thread programmed to: instantiate an immutable object; provide, to a first consumer thread of the multi-threaded process, a reference to the immutable object; increment, responsive to providing the reference to the immutable object, a reference counter to record ownership of the immutable object by the first consumer thread, wherein the reference counter is local to the producer thread and inaccessible to the at least two consumer threads; receive, from the consumer thread, a notification that the first consumer thread has finished processing the immutable object; decrement, responsive to receiving the notification, the reference counter; and delete, based on the reference counter, the immutable object.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
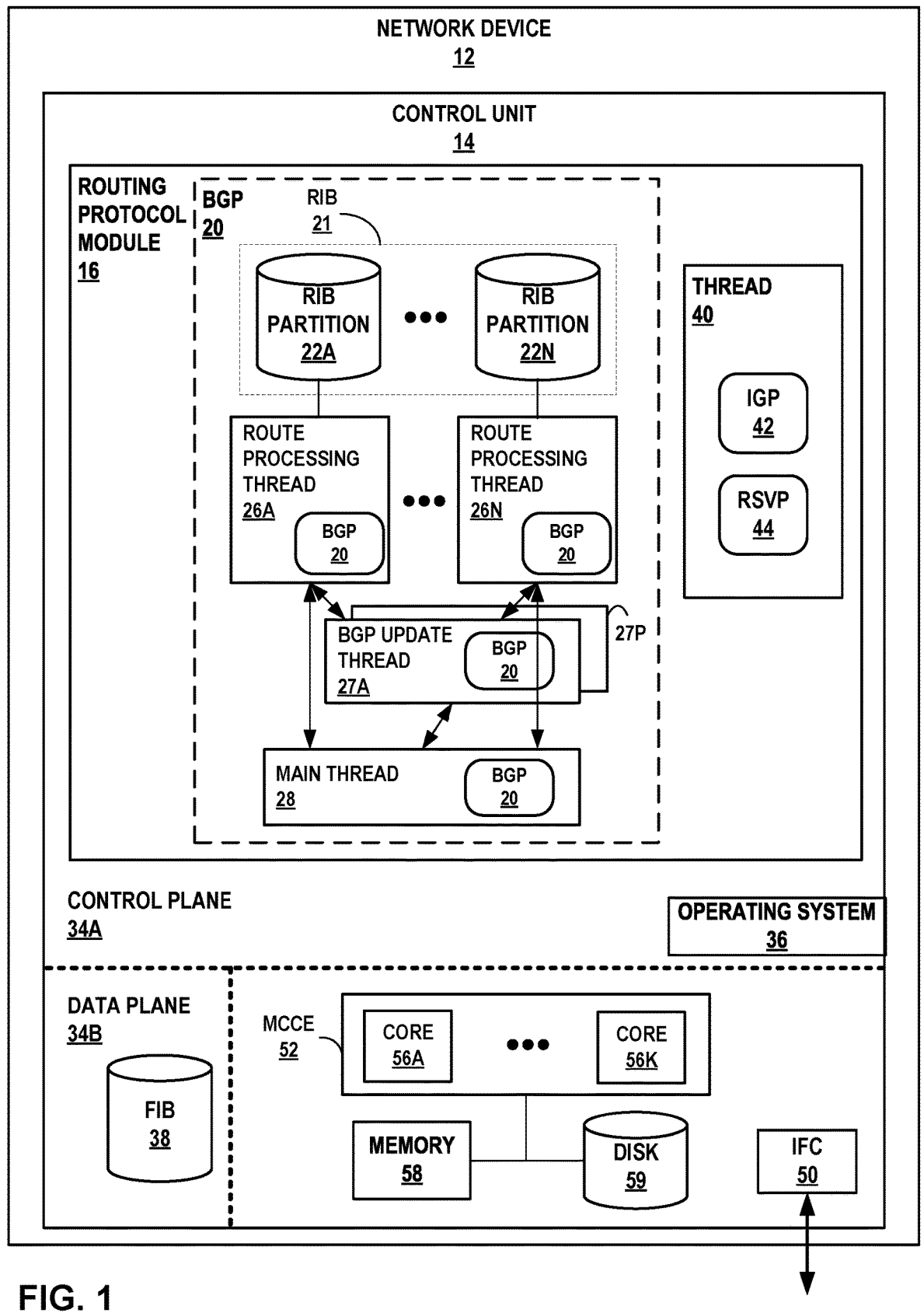
FIG. 1 is a block diagram illustrating an example network device configured to execute parallel route processing threads that perform object management according to techniques of this disclosure.

FIG. 1 is a block diagram illustrating an example network device configured to execute parallel route processing threads and perform object management according to techniques of this disclosure. Network device 12 may, for example, represent a router, route reflector, or other network device that is connected via one or more network links to other network devices that advertise routes to the network device 12. For example, network device 12 may be a core or edge router of a service provider network, enterprise network, edge network such as a data center network, an access router, a controller, a real or virtual server or other compute node configured to execute a route or route reflector, or a route reflector of any of the aforementioned networks or other network.

In this example, network device 12 includes a multi-core computing environment (MCCE) 52 that includes a plurality of processors or processing cores 56A-56K (collectively, "cores 56"). Multi-core computing environment 52 may include any number of processors and any number of hardware and/or virtual execution cores from, for example, four to thousands. Each of cores 56 includes an independent execution unit to perform instructions that conform to an instruction set architecture for the core. Cores 56 may each be implemented as separate integrated circuits (ICs) or may be combined within one or more multi-core processors (or "many-core" processors) that are each implemented using a single IC (i.e., a chip multiprocessor), package, or die. Alternatively, or in addition, multi-core computing environment 52 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. As used herein, "processor" or "processing circuitry" may refer to one or more cores 56.

Memory 58 represents a main memory. Examples of memory 58 include non-transitory computer-readable mediums including memory such as random-access memory (RAM) (including various forms of dynamic RAM (DRAM), e.g., DDR2 SDRAM and DDR3), static RAM (SRAM), and Flash memory. Storage disk 59 is a form of fixed or removable storage medium that can be used to carry or store desired program code and program data in the form of instructions or data structures and that can be accessed by a processor such as core 56. In one example approach, storage device 59 may include volatile or non-volatile memory that stores instructions to cause the one or more cores 56 to perform techniques described herein. Examples of storage device 59 include a disk drive and/or an optical drive.

Multi-core computing environment 52, memory 58, and storage device 59 provide a hardware operating environment for a control unit 14 that performs control plane 34A and, in some cases, forwarding or data plane 34B functionality for network device 12. That is, in this example, control unit 14 is divided into two logical or physical "planes" to include a first control or routing plane 34A ("control plane 34A") and a second data or forwarding plane 34B ("data plane 34B"). That is, control unit 14 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 34A defines control plane functionality of network device 12. Control plane 34A manages and controls the behavior of network 12, including the behavior of data plane 34B. Operating system 36 of control plane 34A provides a run-time environment for multiple different processes each made up of one or more execution threads. Operating system 36 may represent, for example, a UNIX operating system derivative such as Linux or Berkeley Software Distribution (BSD). Operating system 36 may offer libraries and drivers by which processes may interact with data plane 34B, for example, or other hardware of network device 12, including a filesystem and main memory for network device 12. Libraries and drivers of operating system 36 may include Application Programming Interfaces (APIs) that provide standard interfaces for developers to invoke the functionality of operating system 36 and network device 12 exposed by the libraries and drivers. Operating system 36 supports multi-threading for multiple software execution threads.

Although described with respect to a network device 12 that includes a data plane 34B for forwarding packets in accordance with routing information including received routes, the techniques of this disclosure are applicable to network devices, such as controllers and route reflectors, that perform control plane 34A operations but may perform no or limited data plane 34B operations with respect to forwarding transit packets in accordance with routing information including received routes. In some cases, the control plane 34A and data plane 34B are not co-located within a single network device chassis but are distributed among multiple devices. For example, examples of network device 12 that are controllers may perform the techniques described herein with respect to route processing and may program, using software-defined network (SDN) techniques, one or more network nodes with forwarding information to implement the routes within the network.

Network device 12 includes one or more network interface card(s) 50 coupled to control unit 14 via a bus or other communication links. Interface card(s) include one or more ports configured to receive network cables used to couple network device 12 to network devices that advertise routes according to a routing protocol.

Control plane 14 of control unit 14 is configured to execute a routing protocol module 16, which represents one or more computer software processes for managing routing information of network 12 by, e.g., executing routing protocols to advertise and receive routes, processing received routes to resolve next hops, and in some cases generating forwarding information for installation within data plane 34B. In the example of network device 12, forwarding information for the network device 12 is represented by forwarding information base (FIB) 38 of data plane 34B. Other operations performed by routing protocol module 16 may include computing label-switched paths (LSPs), signaling LSPs using an LSP signaling protocol, managing routing instances, managing layer 2 and layer 3 virtual private networks, and managing multicast groups and computing multicast distribution trees for multicast traffic, for instance.

Routing protocol module 16 includes software execution threads 26, 27, 28, and 40, each of which may execute on a different one of cores 56. In one example approach, threads 26, 27, 28, and 40 are scheduled by operating system 36 for execution by cores 56 according to a multi-threading scheduling scheme, e.g., using time-slicing, and routing protocol module 16 may represent an overall software process having the multiple software execution threads (which may also be referred to as a multi-threaded process).

As one example, one or more protocol threads 40 execute one or more protocols such as interior gateway protocol (IGP) 42 and resource reservation protocol (RSVP) 44. IGPs for IGP 42 may include open shortest path first (OSPF), intermediate system to intermediate system (IS-IS), and routing information protocol (RIP), for instance. Other protocols (not shown) that may be executed by thread 40 may include signaling and control protocols for L3VPN, L2VPN, Ethernet VPN, Multicast VPN, Virtual Private LAN Service, Protocol Independent Multicast, Label Distribution Protocol, for instance.

Although techniques of this disclosure are described primarily with respect to the Border Gateway Protocol (BGP), the techniques are similarly applicable to processing routing information received in routing protocol messages according to other layer 3 routing protocols, as well as interior gateway protocols in which route resolution is required, such as any distance-vector protocol (e.g., RIP).

In the example of FIG. 1, routing protocol module 16 includes one or more Border Gateway Protocol (BGP) input-output (10) thread(s) (shown in FIG. 1 as BGP update threads 27A-27P (collectively, "BGP update threads 27")) that receive and output routing protocol messages for a routing protocol, BGP 20 in this example. BGP update thread(s) 27 may manage a receipt queue of routing protocol messages received by network device 12 at IFC(s) 50 for processing by main thread 28, by route processing threads 26A-26N (collectively, "route processing threads 26") and by the BGP update threads 27A-27P (collectively, "BGP update threads 27"). BGP update thread(s) 27 may manage an output queue of routing protocol messages generated by BGP update thread(s) 27 from route update information received from routing processing threads 26 for output via IFC(s) 50. In one example approach, the number of route processing threads 26, N, and BGP update threads 27, P, may be configurable by a user or operator of network device 12.

Furthermore, routing protocol module 16 may include additional one or more threads (not shown) for managing and/or exchanging routes with the kernel routing table (also not shown). In some examples, main thread 28 and protocol thread(s) 40 may be combined as a single thread, or as a set of two or more threads that perform similar operations for a common set of protocols. In one example approach, as shown in FIG. 1, main thread 28 may communicate directly with route processing threads 26 and with BGP update threads 27 to exchange information such as route update information generated by main thread 28, peer state transitions, configuration synchronization information and query statistics. In one such example approach, the route update information from processing thread 26 may include information such as an advertising prefix, metrics and peers to which device 12 advertises.

As shown in FIG. 1, routing information base (RIB) 21 is partitioned into two or more RIB partitions 22A-22N, (collectively, "RIB partitions 22"), with each RIB partition 22 associated with one of the route processing threads 26. Route processing threads 26 manage respective, separate partitions of routing information in the form of routing information base (RIB) partitions 22A-22N, with each of the RIB partitions 22 storing a different portion of the routes that make up the overall RIB 21 for network device 12.

As shown in the example of FIG. 1, routing protocol module 16 includes multiple, concurrently executing, route processing threads 26 for distributing and performing distributed processing of routes received in routing protocol messages by network device 12. In general, a routing protocol message advertises one or more routes, each route made up of a destination network prefix and a next hop router (or more simply, "next hop") of the network for reaching the destination network prefix. For example, a BGP UPDATE message is an example of a routing protocol message and includes a NEXT_HOP path attribute that specifies a next hop for one or more destination network prefixes included in respective network layer reachability information (NRLI) of the BGP UPDATE message. The destination network prefix and the next hop may be expressed as addresses in the Internet Protocol (e.g., IPv4, IPv6) address space. A next hop is an example of forwarding information for a network prefix. Routing protocol module 16 is described further in U.S. patent application Ser. No. 15/841,023, filed Dec. 13, 2017, the description of which is incorporated by reference.

Route processing threads 26 may be substantially similar in that each of routing processing threads 26 separately executes similar operations for processing routing protocol messages received by network device 12. Examples of such operations are described in further detail with respect to FIG. 2. Operating system 36 may schedule two or more route processing threads 26 to execute at least partially concurrently on respective cores 56 such that multiple route processing threads 26 may execute at least partially in parallel (which, in the context of computer science, may refer to concurrent execution of two or more threads by multiple cores) to process respective routing protocol messages concurrently. In addition, although the techniques are described primarily with respect to a single multi-threaded process (i.e., routing protocol module 16), various aspects of the techniques described in this disclosure may be applied using multiple threads executing within different processes located on a single network device or distributed among multiple different network devices. For example, a BGP update thread 27 may execute on a load balancing device to distribute received routes among multiple separate network devices each configured to execute one or more of routing processing threads 26 to process routes in the manner described herein.

As noted above, route processing threads 26 manage respective, separate partitions of routing information in the form of routing information base (RIB) partitions 22A-22N. In the example of FIG. 1, in which routing protocol module 16 processes BGP UPDATE messages, each of threads 26, 27 and 28 execute at least a subset of the BGP routing protocol operations. For example, route processing threads 26 may process the received BGP UPDATE messages, resolve next hops for routes received in the BGP UPDATE messages, and transmit route update information to BGP update thread 27, where the route update information is used by the BGP update thread 27 to generate a BGP UPDATE message and to transmit the BGP UPDATE message to other network devices.

Network device 12 receives, via IFC(s) 50, routing protocol messages and, in one example approach, control plane 34A processes the routing protocol messages as control plane messages. In particular, routing protocol module 16 processes the routing protocol messages. In one such example approach, for a routing protocol message received by network device 12, one of BGP update thread(s) 27 initially processes the routing protocol message, which includes a route, to identify one of the route processing threads 26 with which to process the route. For example, a BGP update thread 27 may apply a hash function to a network prefix for the route, where a number of hash buckets for the hash function is configured to be the number of route processing threads 26 and each hash bucket corresponds to the assigned route processing thread 26 for routes hashed to the hash bucket. The BGP update thread 27 may apply the hash function to select bits of the network prefix in some cases, and in some cases BGP update thread 27 may apply the hash function to other attributes of a received routing protocol message in addition or in the alternative to the network prefix. As another example, the BGP update thread 27 may apply another operation to identify one of the route processing threads 26 with which to process the route, such as using bit patterns applied to bits of a network prefix, the masked values of which being mapped to the route processing threads 26. In such cases, BGP update thread 27 stores a data structure that maps each result value for application of bit patterns to one of route processing threads 26.

The BGP update thread 27 then invokes the identified route processing thread 26 to process the route. For example, BGP update thread 27 may add the route or the full routing protocol message to a queue of routing protocol module 16 shared by the various route processing threads 26 but processed by the identified route processing thread 26 for the route.

One disadvantage of RIB partitioning is that partitioning may increase the amount of time required to advertise BGP routes. For example, in a RIB that is not partitioned, updates corresponding to particular outgoing attributes are sent in the same BGP update message. That is, if the prefixes P1, P2, P3, and P4 to be updated share the same attribute A1, BGP route update information for prefixes P1, P2, P3, and P4 go in same BGP update message. Similarly, if the prefixes P5, P6, P7, and P8 to be updated share the same attribute A2, BGP route update information for prefixes P5, P6, P7, and P8 go in same BGP update message.

In a partitioned RIB, prefixes are distributed across the RIB partitions 22. Given the scenario discussed in the previous paragraph, for instance, in a RIB 21 having two RIB partitions 22A and 22B, where the prefixes are distributed as P1, P3, P5 and P7 to the first partition and P2, P4, P6 and P8 to the second partition, each RIB partition 22 generates two BGP update messages. The BGP update messages for RIB partition 22A include a BGP update for P1 and P3 and a BGP update for P5 and P7, while the BGP update messages for RIB partition 22B include a BGP update for P2 and P4 and a BGP update for P6 and P8. That is, the number of BGP update messages needed has the potential to increase by a factor of P, where P is the number of partitions. The increased number of update messages may reduce or eliminate any gains due to concurrency. In addition, the increased number of update messages may have a negative impact on downstream routers, which incur the load of processing increased updates. The situation is not improved if updates are generated and then recombined elsewhere. Instead, in one example approach, BGP update threads 27 are used to address this issue.

As noted above, route processing threads 26 transmit route update information associated with prefixes to be updated that are stored within a RIB partition 22 associated with the respective route processing thread 26. In one example approach, route processing threads 26 transmit route update information associated with a given BGP peer group to a BGP update thread 27 serving the given BGP peer group. The BGP update thread 27 generates a BGP update message from the route update information received from the various route processing threads 26. In one example, BGP update thread 27 constructs each BGP update message to include route update information for prefixes having the same outgoing attribute, even if the route update information received is from two or more route processing threads 26. Such an approach allows a BGP update thread 27 serving a given BGP peer group to pack prefixes having the same attributes (potentially belonging to different route processing threads 26) in the same outbound BGP update message.

As a result of such packing, BGP update thread 27 may enable or improve parallelization for route processing within network device 12 by distributing route processing among the multiple route processing threads 26 by network prefix, rather than by route processing task or operation. This may reduce the latency for processing any given route received by network device 12 and/or may reduce the overall route convergence time for network device 12. In addition, BGP update thread 27, though such packing, may improve parallelization for route processing within network device 12 by packing prefixes having the same attributes (potentially belonging to different route processing threads 26) in the same outbound update message. This approach reduces the number of BGP update messages transmitted and, thus, helps improve convergence. More information regarding the packing of BGP update messages can be found in U.S. application Ser. No. 16/836,436, entitled "BORDER GATEWAY PROTOCOL UPDATE PACKING FOR A DISTRIBUTED ROUTING INFORMATION BASE," and filed Mar. 31, 2020, the entire contents of which are incorporated by reference as if set forth in its entirety herein.

However, the packing of BGP update messages or other data objects (which may also be referred to as "objects") may result in difficulties with object management. As each route processing thread of route processing threads 28 generates a reference (such as a pointer) to the objects (which in this instance may refer to the information to be specified in BGP update messages), each route processing thread may lock the object to prevent the object from being deleted or otherwise modified by another route processing thread. Once locked, the route processing thread that requested the lock may read the object and provide the object to BGP update thread 27 so that a respective BGP update message can be generated. Such locks however may present other route processing threads from reading the object (which may be denoted as a mutual exclusion object in this context, which is often denoted as a "mutex"). As objects are locked, the route processing threads may sit idle until the lock is removed, thereby potentially degrading in certain situation, such as BGP update processing, the benefits of concurrent execution of multiple threads.

In circumstances where the objects are immutable (meaning that the object state cannot be changed), such as for information specified in the BGP update messages, route processing threads 26 may forego locks as the objects cannot be changed after being instantiated and set with initial values. Yet, even for lockless objects, route processing threads 26 may produce large numbers of objects to be specified in BGP update messages that are consumed by a number of different BGP update threads 27 (and potentially multiple times by any given one of BGP update threads 27). Route processing threads 26 may expend significant overhead managing each generated object to determine when to delete the object (and thereby free up memory for newer objects) such that benefits of concurrent execution of multiple threads is degraded.

In accordance with various aspects of the techniques described in this disclosure, route processing threads 26 may manage immutable objects being generated by route processing threads 26 in a distributed manner to alleviate overhead associated with determining when to delete the underlying immutable objects used to form BGP update messages. Route processing threads 26 may maintain a single reference counter for each immutable object that indicates how many times route processing thread 26 (again, acting as a producer thread of threads 26/27) has provided, to BGP update threads 27 (again, acting as consumer threads of threads 26/27), a reference to each immutable object used to form the BGP update messages. Route processing thread 26 may only maintain this reference counter without any other supporting data (such as a list of BGP update threads 27 to which route processing thread 27 has provided the immutable object).

Each BGP update thread of BGP update threads 27 may separately maintain a hold reference counter for each immutable object provided to one or more of BGP update threads 27. The hold reference counter indicates a number of times route processing thread 27 has provided the immutable object from the time of instantiation of the immutable object. For example, route processing thread 26 may provide, to BGP update thread 27A, a reference to the immutable object, where BGP update thread 27A may increment the hold reference counter associated with the immutable object by one. Although described with respect to BGP update thread 27A, it should be understood that any one of BGP update threads 27A may perform the same or substantially similar operations to those described with respect to BGP update thread 27A.

In any event, BGP update thread 27A may also maintain a local reference counter for each immutable object that is incremented by one upon receipt of each reference to the immutable object. As BGP update thread 27A completes processing of the immutable object (possibly multiple times when multiple references to the same immutable object are provided to BGP update thread 27A), BGP update thread 27A decrements the local reference counter. When BGP update thread 27A determines that the local reference counter equals zero, BGP update thread 27A may generate a notification indicating that BGP update thread 27A has finished processing the immutable object. The notification may include the hold reference counter. BGP update thread 27A may send the notification to route processing thread 26. Again, each of BGP update threads 27 may operate similarly to BGP update thread 27A to provide notifications to route processing thread 26.

Route processing thread 26 may receive the notification and decrement, responsive to receiving the notification, the reference counter associated with each immutable object. Route processing thread 26 may decrement the reference counter by the hold reference counter specified in the notification. Route processing thread 26 may determine whether the reference counter equals zero. Responsive to determining that the reference counter equals zero, route processing thread 26 may delete the immutable object.

As such, route processing thread 26 distributes management of state information for reclaiming memory to which the BGP update messages are stored (or, in other words, for performing so-called garbage collection), and processing between route processing thread 26 and BGP update threads 27. Distribution of management of state information and processing may facilitate concurrent execution of threads 26/27 with potentially little degradation of the concurrent execution benefits described above (as there is only minor operations to increment and decrement the above noted counters). In this respect, various aspects of the techniques may enable network device 12 to operate more efficiently in terms of processing cycles, memory, and memory bandwidth consumed.

Although described with respect to routing information generated by route processing threads 26 as immutable objects, the immutable object may represent other types of data, such as states of IFC 50, control plane 34A, data plane 34B, or other components of network device 12. That is, network device 12 may communicate states of various components of network device 12 between the components such that routing information may be generated to reflect changes of network device 12 or other configuration state changes may occur as a result of providing the state updates. Such state may be immutable and therefore represent an immutable object. The component providing the state may represent a producer thread, while a component consuming the state may represent a consuming thread.

Moreover, although described in the context of a network device, various aspects of the techniques may apply outside of the context of a network device. For example, operating system generate state data that is immutable, which is shared between various components within and outside of the operating system. A kernel of the operating system may act as a producer thread to share state of hardware components with applications executing in an application space provided by the operating system, where the applications may represent consumer threads.

Figure 2:
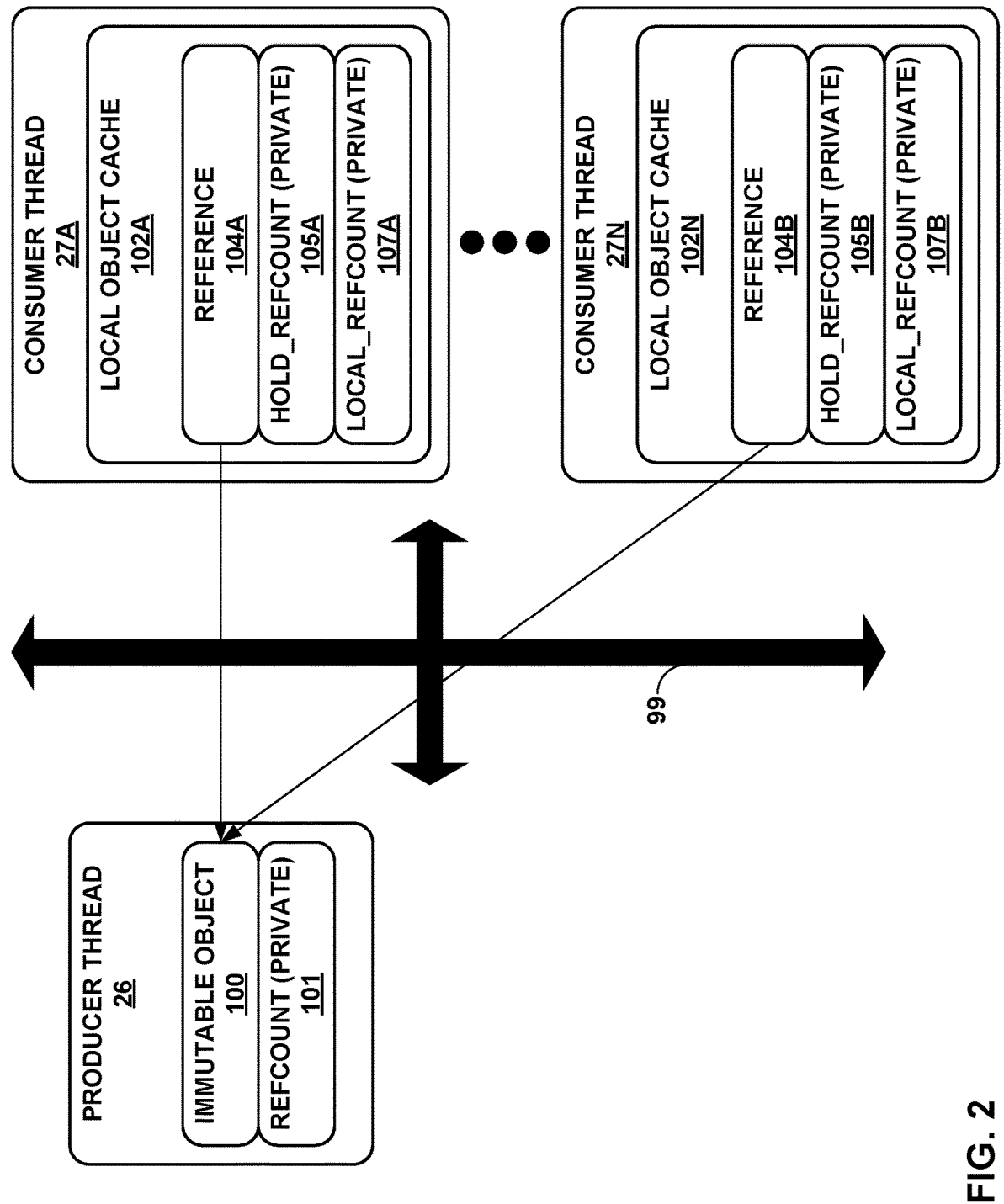
FIG. 2 is a conceptual diagram illustrating lockless management of immutable objects by multiple threads executed by the network device shown in FIG. 1 in accordance with various aspects of the techniques described in this disclosure.

FIG. 2 is a conceptual diagram illustrating lockless management of immutable objects by multiple threads executed by the network device shown in FIG. 1 in accordance with various aspects of the techniques described in this disclosure. As shown in the example of FIG. 2, a producer thread 26 (which is another way to refer to a single instance of route processing threads 26) may communicate immutable objects with consumer threads 27A-27N ("consumer threads 27," which is another way to refer to instances of BGP update threads 27) via a lockless queue 99 that does not require atomic reference count operations.

In operation, producer thread 26 may instantiate an immutable object 100 and share or otherwise provide, to consumer thread 27A and consumer thread 27N, a reference 104A and 104B to immutable object 100 via lockless queue 99. When instantiating immutable object 100, producer thread 26 may also initialize a reference counter 101 ("REFCOUNT 101") as a private variable (which in the context of computer science refers to the property for reference counter 101 that only producer thread 26 is able to access reference counter 101).

Each of consumer threads 27A and 27N may create a local object cache 102A and 102N respectively by requesting respective portions of memory 58 (shown in FIG. 1) be allocated to consumer thread 27A and 27N. Consumer threads 27A and 27N may store references 104A and 104B to respective local object caches 102A and 102N. References 104A and 104B may each represent a pointer, which refers to a memory address at which immutable object 100 is stored within memory 58. For each reference, local object cache 102A and 102N includes a hold reference counter and a local reference counter.

In the example of FIG. 2, local object cache 102A includes, for reference 104A, a hold reference counter 105A ("HOLD_REFCOUNT 105A," which is a private variable to consumer thread 27A) and a local reference counter 107A ("LOCAL_REFCOUNT 107A," which again is private to consumer thread 27A). Local object cache 102N includes, for reference 104B, a hold reference counter 105B ("HOLD_REFCOUNT 105B," which is a private variable to consumer thread 27N) and a local reference counter 107B ("LOCAL_REFCOUNT 107B," which again is private to consumer thread 27N). Because reference counter 101, hold reference counters 105A/105B, and local reference counters 107A/107B are private and do not require atomic access or mutual exclusion, threads 26/27 may avoid costs associated with atomic operations. The costs of atomic operations are described in more detail in a paper by Schweizer, H. et el., entitled "Evaluating the Cost of Atomic Operations on Modern Architectures," published by the Institute of Electrical and Electronics Engineers (IEEE) on Mar. 10, 2016, the entire contents of which are hereby incorporated by reference as if set forth in its entirety.

When providing references 104A and 104B to each of consumer threads 27A and 27N, producer thread 26 may increment reference counter 101 by one, resulting in reference counter 101 having a value of two. Consumer thread 27A, upon receiving reference 104A, may first perform a lookup of reference 104A in local object cache 102A to determine if reference 104A has previously been provided by producer thread 26 to consumer thread 27A. In this example, consumer thread 27A determines that reference 104A has not been previously provided to consumer thread 27A and, as a result, stores reference 104A to local object cache 102A and instantiates hold reference counter 105A and local reference counter 107A, associating each of hold reference counter 105A and local reference counter 107A with reference 104A in local object cache 102A. Consumer thread 27N may operate similarly to consumer thread 27A, storing reference 104B to local object cache 102N and instantiating hold reference counter 105B and local reference counter 107B, each of which is associated with reference 104B in local object cache 102N.

Consumer thread 27A may increment hold reference counter 105A by one and local reference counter 107A by one. Hold reference counter 105A may indicate a number of times, from the instantiation of immutable object 100, that producer thread 26 has provided reference 104A to consumer thread 27A. Local reference counter 107A may indicate a local interest of consumer thread 27A in reference 104A, tracking local processing of reference 104A by consumer thread 27A.

As consumer thread 27A finishes processing reference 104A, consumer thread 27A decrements local reference counter 107A, thereby tracking "interest" by consumer thread 27A in reference 104A. After decrementing local reference counter 107A, consumer thread 27A may determine whether local reference counter 107A equals zero. When consumer thread 27A determines that local reference counter 107A equals zero, consumer thread 27A may generate a notification indicating that consumer thread 27A has finished processing reference 104A (or, in other words, immutable object 100 to which reference 104A refers). Consumer thread 27A may specify, in the notification, hold reference counter 105A, and communicate the notification to producer thread 26. Again, consumer thread 27N may operate in a similar, if not substantially similar, way as that described above with respect to consumer thread 27A.

Producer thread 26 may receive each of the notifications from consumer thread 27A and 27N. Responsive to receiving each of the notifications, producer thread 26 may decrement reference counter 101. Producer thread 26 may determine, based on reference counter 101, whether to delete immutable object 100. For example, producer thread 26 may decrement reference counter 101 by the value of hold reference counter 105A specified in the notification from consumer thread 27A, and determine whether reference counter 101 equals zero. When reference counter 101 does not equal zero, producer thread 26 may defer deletion of immutable object 100. Assuming the notification from consumer thread 27A arrives prior to the notification from consumer thread 27N for purposes of illustration, producer thread 26 determines that reference counter 101 is greater than zero and therefore defers deletion of immutable object 100.

Upon receiving the notification from consumer thread 27N, producer thread 26 again decrements reference counter 101 by the value of hold reference counter 105B specified in the notification from consumer thread 27N. Producer thread 26 again determines whether reference counter 101 is equal to zero. Assuming, again for purposes of illustration, that immutable object was only shared with consumer threads 27A and 27N, producer thread 26 determines that reference counter 101 is equal to zero. Responsive to determining that reference counter 101 is equal to zero, producer thread 26 deletes immutable object 100 and reference counter 101. Each of consumer threads 27A and 27N also delete reference 104A/104B, hold reference counters 105A/105B, and local reference counters 107A/107B after sending the respective notifications.

FIG. 3A-3D are conceptual diagrams illustrating, in more detail, lockless management of immutable objects by a producer thread in accordance with various aspects of the techniques described in this disclosure. Referring first to the example of FIG. 3A, a producer thread 26, which may again be another way to refer to a single instance of route processing threads 26 shown in the example of FIG. 1, may initially instantiate object 100, initializing reference counter 101 as described above to have a value of zero. Producer thread 26 may also create references 104A and 104B, storing the references 104A and 104B to the lockless queue associated with respective consumer threads 27A and 27N (shown in the example of FIG. 2). Responsive to storing each of references 104A and 104B to the respective lockless queues 99 associated with consumer threads 27A and 27N, producer thread 26 may increment reference counter 101 by one each time such that reference counter 101 has a value of two.

Consumer threads 27A and 27N perform similar operations to that described above with respect to the example of FIG. 2. That is, consumer thread 27A performs the lookup to determine whether a reference to immutable object 100 already exists in local object cache 102A. Responsive to determining that the reference to immutable object 100 does not already exist (as immutable object 100 was recently instantiated by producer thread 26), consumer thread 27A stores reference 104A in local object cache 102A, and creates and increments by one hold reference counter 105A such that hold reference counter 105A has a value of one. Consumer thread 27N operates in a similar manner to that described above with respect to consumer thread 27A. Each of consumer threads 27A and 27N proceed to read immutable object 100 and generate one or more BGP update messages based on immutable object 100.

Figure 3A:
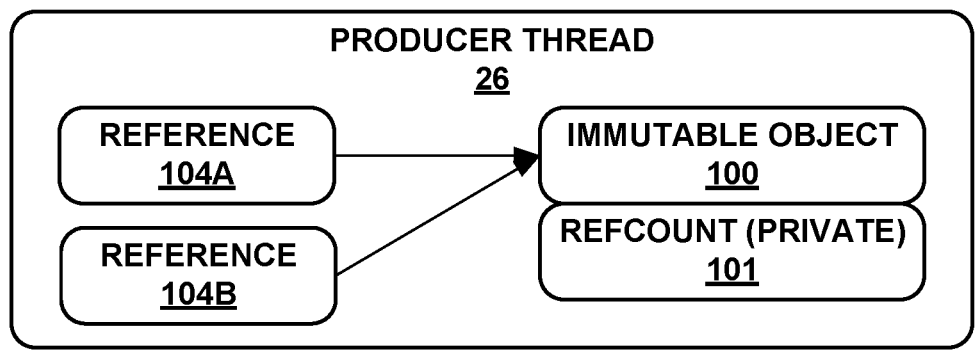
FIG. 3A-3D are conceptual diagrams illustrating, in more detail, lockless management of immutable objects by a producer thread in accordance with various aspects of the techniques described in this disclosure.
Figure 3B:
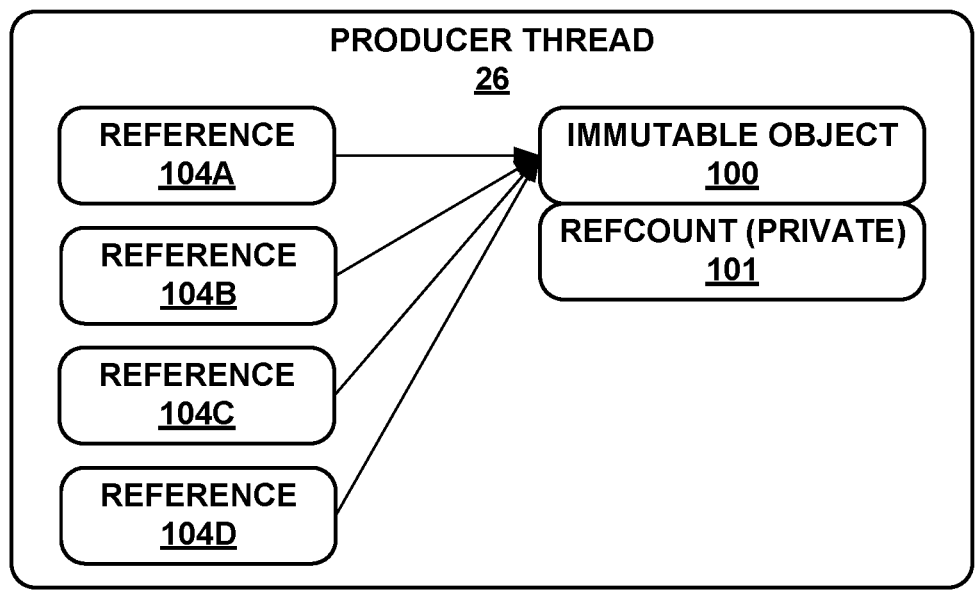

Referring next to the example of FIG. 3B, producer thread 26 creates two more references 104C and 104D that both reference immutable object 100. Responsive to creating references 104C and 104D, producer thread again increments reference counter 101 by a value of one for each of references 104C and 104D such that reference counter 101 has a value of four. Producer thread 26, in this example, provides references 104C and 104D to consumer thread 27A via the lockless queue 99 associated with consumer thread 27A.

Responsive to receiving references 104C and 104D, consumer thread 27A performs a lookup in local object cache 102A to determine whether a reference to immutable object 100 already exists in local object cache 102A. In this example, consumer thread 27A determines that a reference to immutable object 100 already exists in local object cache 102A in the form of reference 104A. As such, consumer thread 27A may increment, for each of references 104C and 104D, hold reference counter 105A by one such that hold reference counter 105A has a value of three. Consumer thread 26A may proceed to read immutable object 100 (two times, once each for reference 104C and 104D) and generate one or more BGP update messages based on immutable object 100.

Figure 3C:
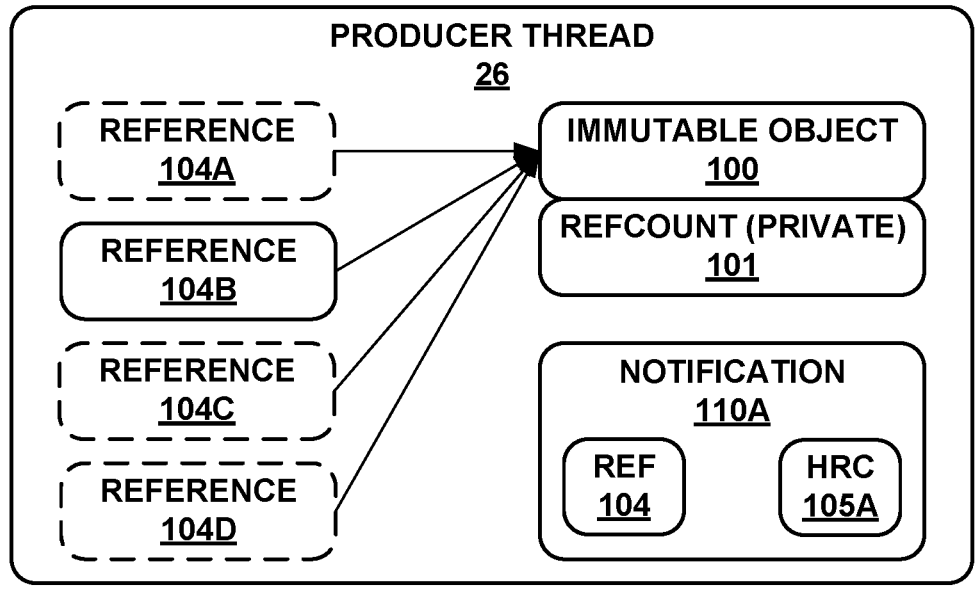

Referring to the example of FIG. 3C, consumer thread 27A may complete or otherwise finish processing of immutable object 100. In other words, consumer thread 27A may finish processing reference 104A, decrement local reference counter 107A by one (which may have a value of greater than one had consumer thread 27A created multiple copies of immutable object 100 for internal processing). Consumer thread 27A may determine whether processing of immutable object 100 has completed by determining whether local reference counter 107A has a value of zero. Assuming that consumer thread 27A determines that local reference counter 107A has a value of two, which is not equal to zero, consumer thread 27A determines that consumer thread 27A has not finished processing of immutable object 100. Consumer thread 27A continues in this manner until local reference counter 107A has a value of zero.

Responsive to determining that local reference counter 107A has a value of zero, consumer thread 27A generates notification 110A, which includes a reference 104 to immutable object 100 and hold reference counter 105A (which has a value of three). Consumer thread 27A communicates notification 110A to producer thread 27, and deletes reference 104A and associated hold reference counter 105A and local reference counter 107A from local object cache 102A. Producer thread 26 receives notification 110A and processes notification 110A to decrement reference counter 101 by hold reference counter 105A such that reference counter 101 has a value of one (as four minus three equals one). Producer thread 26 determines whether immutable object 100 can be deleted by determining whether reference counter 101 equals zero. In this example, producer thread 26 determines that reference counter 101 does not equal zero and defers deletion of immutable object 100.

Figure 3D:
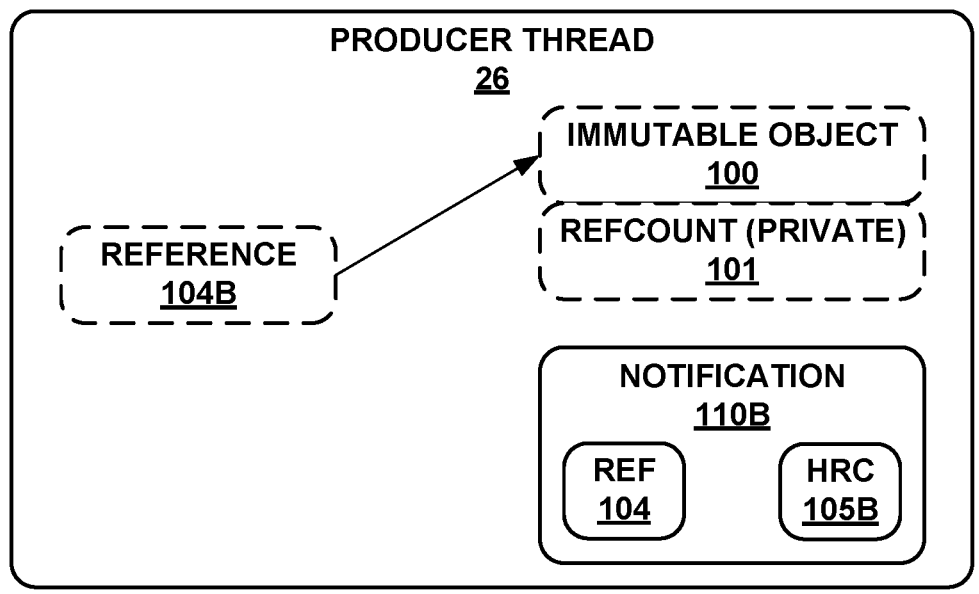

Referring next to the example of FIG. 3D, consumer thread 27N may complete or otherwise finish processing of immutable object 100. In other words, consumer thread 27N may finish processing reference 104B, decrement local reference counter 107B by one such that local reference counter 107B has a value of zero. Consumer thread 27N may determine whether processing of immutable object 100 has completed by determining whether local reference counter 107B has a value of zero. In this instance, consumer thread 27N determines that local reference counter 107B has a value of zero, thereby determining that consumer thread 27N has finished processing of immutable object 100.

Responsive to determining that local reference counter 107B has a value of zero, consumer thread 27N generates notification 110B, which includes a reference 104 to immutable object 100 and hold reference counter 105B (which has a value of one). Consumer thread 27N communicates notification 110B to producer thread 26, and deletes reference 104B and associated hold reference counter 105B and local reference counter 107B from local object cache 102B. Producer thread 26 receives notification 110B and processes notification 110B to decrement reference counter 101 by hold reference counter 105B such that reference counter 101 has a value of zero (as one minus one equals zero). Producer thread 26 determines whether immutable object 100 can be deleted by determining whether reference counter 101 equals zero. In this example, producer thread 26 determines that reference counter 101 equals zero and deletes immutable object 100 and reference counter 101.

While described with respect to a single producer thread 26, various aspects of the techniques may be performed with respect to multiple producer threads. To utilize the techniques with multiple producer threads, the collections of notifications may remain mutually exclusive to reduce an amount of state information exchanged between the producer threads. In some examples, the multiple producer threads may share the same object using a shared memory. Failures of producer threads in this instance may be handled by each of the multiple producers maintaining a reference count per thread/per object. Responsive to detecting a producer thread failure, the producer can bump down thread specific reference counts for the object and reclaim (or, in other words, delete) the object as outlined above.

Figure 4:
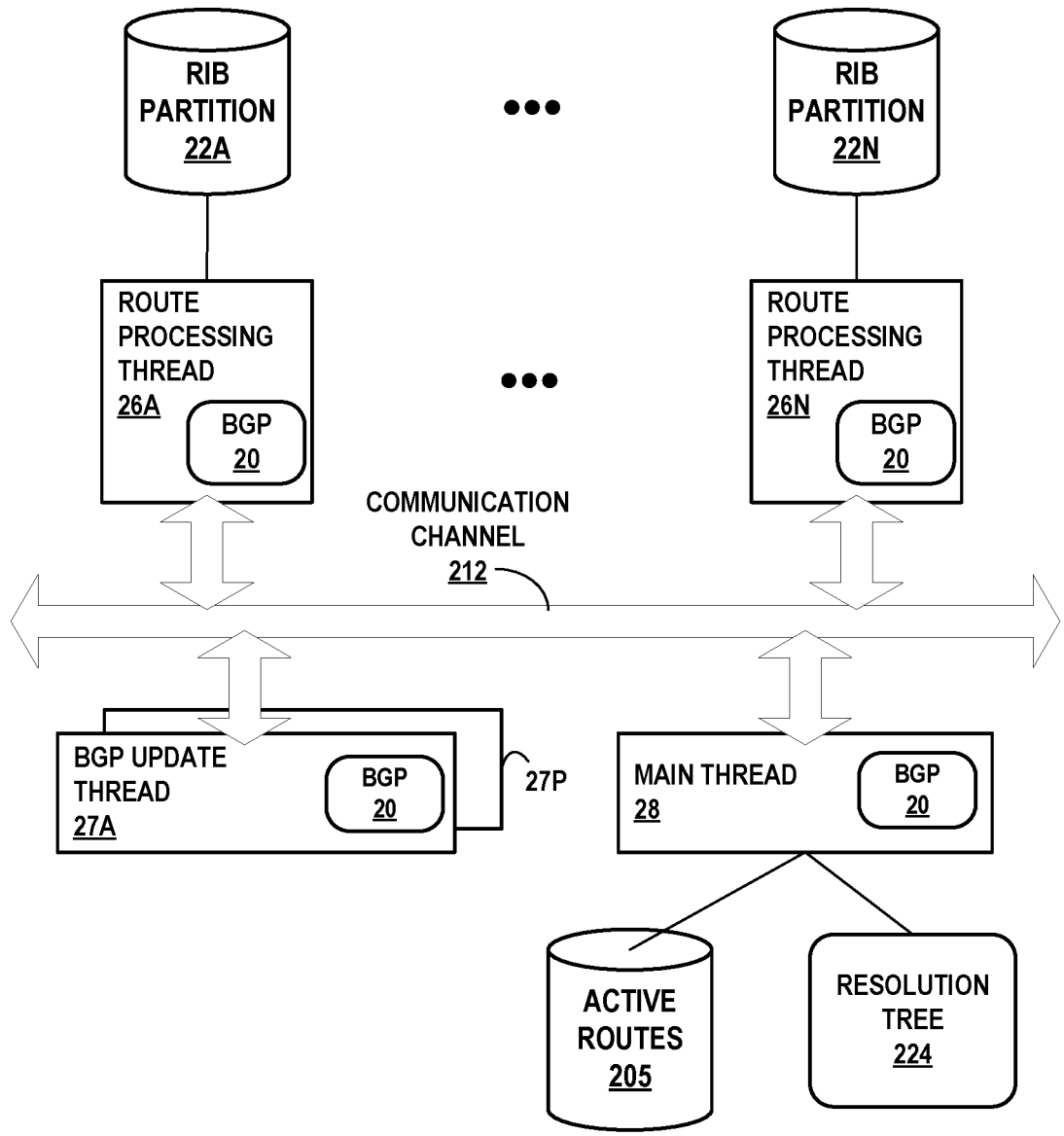
FIG. 4 is a block diagram illustrating an example technique for communicating between threads performing route processing operations, according to techniques described herein.

FIG. 4 is a block diagram illustrating an example technique for communicating between threads performing route processing operations, according to techniques described herein. In one such example approach, route processing threads 26A-26N, BGP update threads 27A-27P, and main thread 28 may communicate using an intra-process, inter-thread communication channel 212. Although referred to as a channel, communication channel 212 may represent any type of inter-thread communication, such as a message bus, message queues, message passing, a file, shared memory or buffer, socket, and so forth.

Each of RIB partitions 22 includes one or more routes stored and managed by a corresponding one of route processing threads 26. Routes stored to RIB partitions 22 may include both active and inactive routes. One or more routes stored to RIB partitions 22 may be associated with resolution information that describes, for instance, a corresponding forwarding next hop of the network device 12 with which to forward packets that travel the route.

Resolution tree 224 maps network prefixes to forwarding next hops of the network device 12 with which network device 12 is to forward matching packets for the network prefixes. Forwarding next hops may represent next hops for an IGP or LSP route required to reach a next hop received in a routing protocol message, e.g., as a NEXT_HOP attribute of a BGP UPDATE message. Such next hops are in some cases referred to as primary next hops. Resolution may refer to BGP resolution, route resolution for another distance vector protocol, or other route resolution.

In one example approach, each of route processing threads 26 requests, from main thread 28, resolution of a next hop for a route received in a routing protocol message assigned to the route processing thread 26. In one such example approach, route processing threads 26 request resolution by posting the next hop via communication channel 212 to main thread 28. Route processing threads 26 additionally post respective sets of active routes from RIB partitions 22 to main thread 28, via communication channel 212, which main thread 28 stores to active routes 205. Each posted active route may include a flag indicating whether the route is a supporting route. The main thread 28 maintains resolution tree 224.

If necessary because main thread 28 has not already resolved a next hop, main thread 28 resolves the next hop for which resolution is requested from one of route processing threads 26. Such resolution may generate resolution information for the next hop, e.g., a forwarding next hop for the corresponding route(s) that specify the next hop. Main thread 28 communicates resolution information for the next hop to the requesting one of route processing threads 26, which may store the resolution information to the corresponding RIB partition 22 in association with the routes that specify the next hop. The requesting one of route processing threads 26 may further mark such routes as active. Example algorithms for route resolution are found in U.S. Pat. No. 7,184,437, issued Feb. 27, 2007, which is incorporated by reference herein in its entirety.

In one example approach, route processing threads 26 post information required to construct BGP update messages (i.e., "route update information") to one of the BGP update threads 27 via communication channel 212. In one such example approach, the BGP update thread 27 that receives the route update information required to construct the BGP update message packs the route update information received into a packed BGP update message with route update information having the same outgoing attribute(s) received from the same or other route processing threads 26. In one such example approach, the BGP update thread 27 that receives the information required to construct the BGP update message then transmits the packed BGP update message to other routers (not shown) via, for instance, one of the network interface cards 50 shown in FIG. 1 using communication channel 212.

Figure 5:
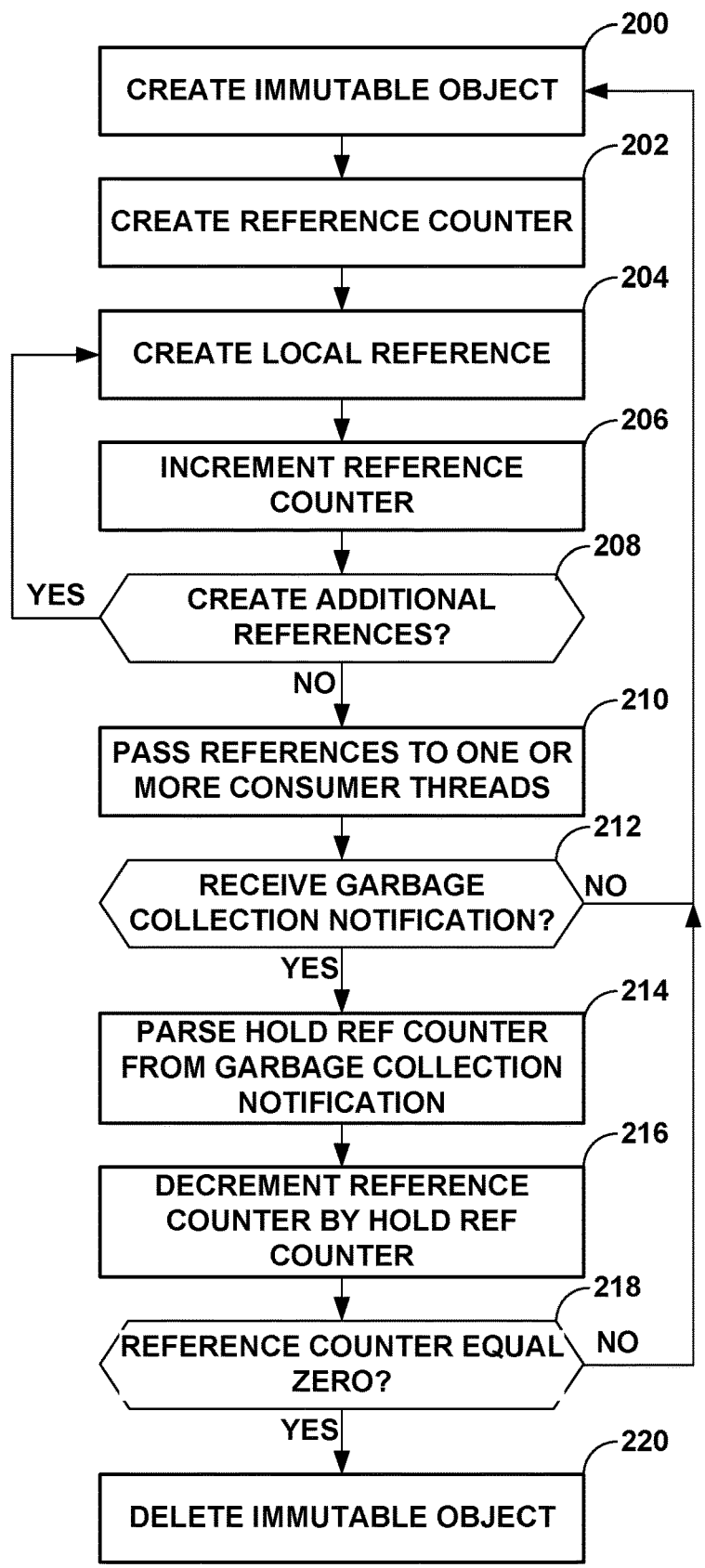
FIG. 5 is a flowchart illustrating example operation of the network device in executing a producer thread that performs object management according to the techniques described in this disclosure.

FIG. 5 is a flowchart illustrating example operation of the network device in executing a producer thread that performs object management according to the techniques described in this disclosure. In the example of FIG. 5, a producer thread 26 (such as that shown in the example of FIGS. 3A-3D) may create an immutable object 100 (200), a reference counter 101 (202), and a reference 104A to immutable object 100 with a value of zero (204). Producer thread 26 may, responsive to creating immutable object 100, increment reference counter 101 by one (206).

Producer thread 26 may next determine whether additional reference are to be created (208). When additional reference are to be created ("YES" 208), producer thread 26 may repeat the above noted process in creating another local reference 104B, and incrementing reference counter 101 by one (for a value of two) (204-208). Producer thread 26 may continue this process until a set number of local references 104 are created (204-208).

When producer thread 26 determines that no additional references are to be created ("NO" 208), producer thread 26 may pass references 104 to one or more consumer threads 27 (210). Producer thread 26 may then determine (possible based on some time-based interval, via interrupt, or some other way common in computing architectures) whether a garbage collection notification 110 (which is another way to refer to notifications 110 discussed in more detail above) have been received (212). When no garbage collection notification 110 has been received ("NO" 212), producer thread 26 may continue to create immutable objects 200 in the manner described above (200-212).

When one or more garbage collection notifications 110 are received ("YES" 212), producer thread 26 may parse hold reference counter value 105 from each garbage collection notification 110 (214) and decrement reference counter 101 by each hold reference counter value 105 (216). Producer thread 26 may next determine whether reference counter 101 equals zero (to determine whether consumers 27 have finished processing of immutable object 100) (218). When reference counter 101 does not equal zero ("NO" 218), producer thread 26 may continue to create immutable objects 200 in the manner described above (200-212). When reference counter 101 equals zero ("NO" 218), producer thread 26 determines that consumers 27 have finished processing immutable object 100 and therefore that immutable object 100 may be deleted. As such, producer thread 26 deletes immutable object 100 (220).

Figure 6A:
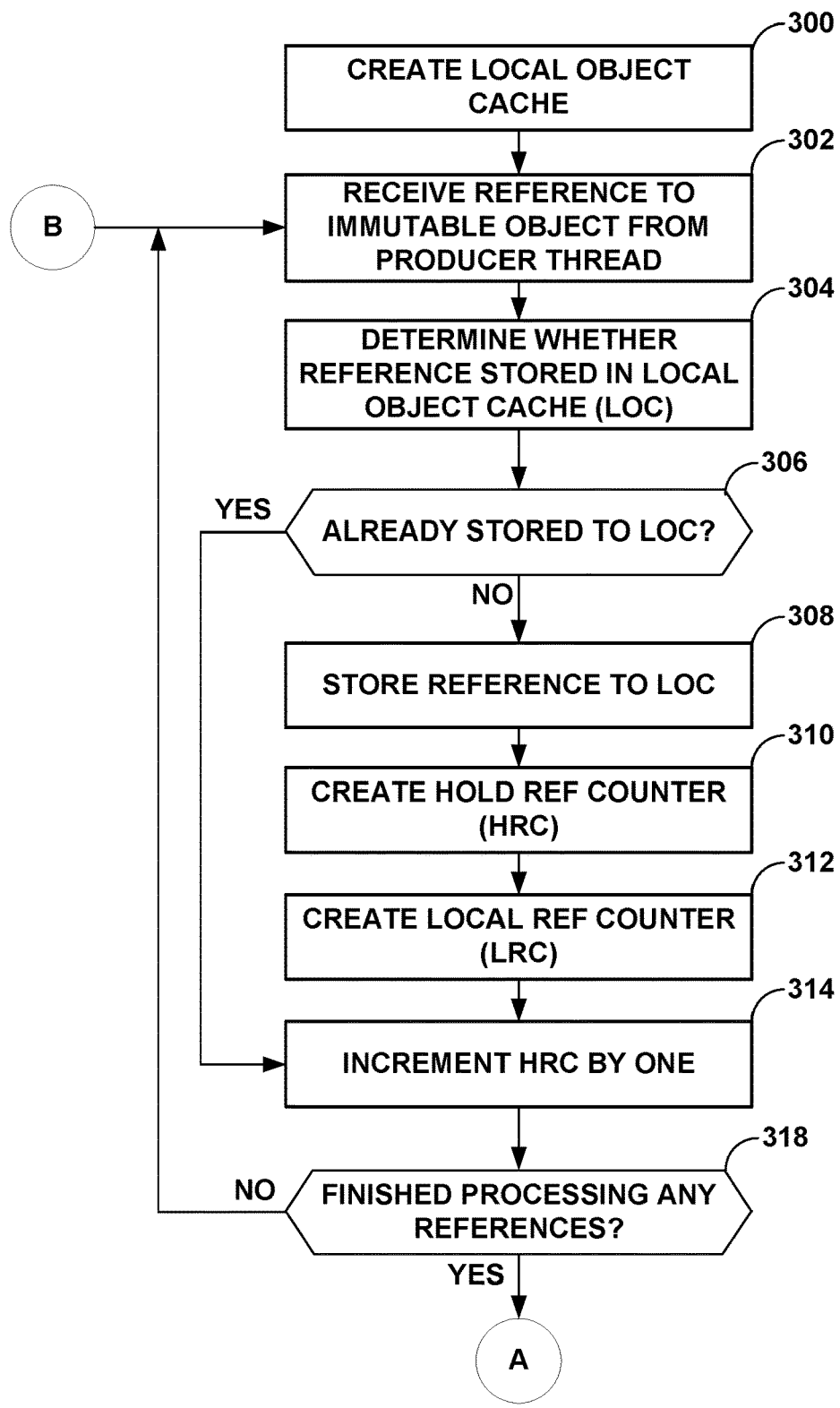
FIGS. 6A and 6B are flowcharts illustrating example operation of the network device in executing a consumer thread that performs object management according to the techniques described in this disclosure.
Figure 6B:
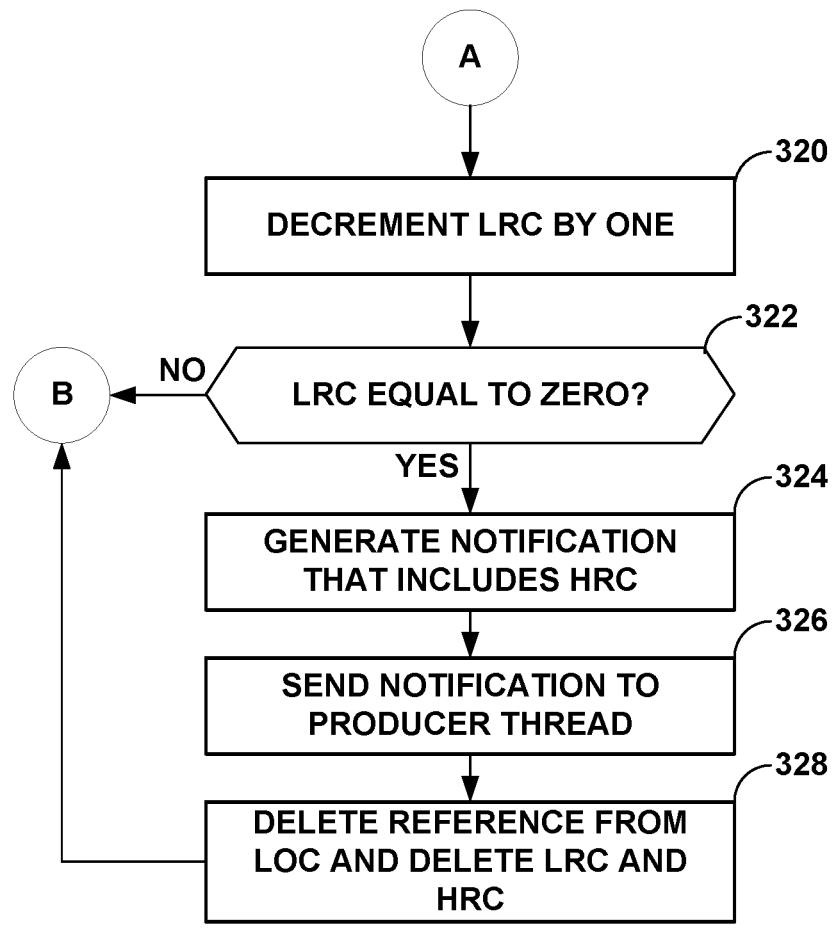

FIGS. 6A and 6B are flowcharts illustrating example operation of the network device in executing a consumer thread that performs object management according to the techniques described in this disclosure. Referring first to the example of FIG. 6A, a consumer thread 27A (as shown in the example of FIG. 2) may create a local object cache 102A (300) in which one or more references 104 are to be stored. Consumer thread 27A may receive a reference 104A to an immutable object 100 from a producer thread 26 (302), and determine whether reference 104A has already been stored in local object cache 102A (304). For example, consumer thread 27A may utilize hashing algorithms with respect to reference 104A to identify whether reference 104A has already been stored to local object cache 102A.

In any event, consumer thread 27A may determine that reference 104A has not already been stored in local object cache 102A ("NO" 306) in which case consumer thread 27A may store reference 104A to local object cache 102A (308), and created hold reference counter 105A and local reference counter 107A (310, 312). After creating hold reference counter 105A and local reference counter 107A or, responsive to determining that reference 104A is already stored in local object cache 102A ("YES" 306), consumer thread 27A may increment hold reference counter 105A by one (314).

Although not shown in the example of FIG. 6A, consumer thread 27A may assign processing of reference 104A to multiple different components of consumer thread 27A, which may result in incrementing local reference counter 316 by one for each time reference 104A is processed by the multiple different components. As such, consumer thread 27A may increment local reference counter 316 when distributing reference 104A to the internal components (which may be sub-threads) of consumer thread 27A for processing without incrementing hold reference counter 105A.

Periodically (via a garbage collection timer) or via some event or interrupt, consumer thread 27A may determine whether processing of any reference 104A is finished (318). Responsive to determining that processing of reference 104A is not finished ("NO" 318), consumer thread 27A may continue to receive references to immutable objects, manage the references, and process the references in the manner described above (302-318). Responsive to determining that processing of references 104A is finished ("YES" 318), consumer thread 27A may decrement local reference counter 107A by one (320, referring next to the example of FIG. 6B), and determine whether local reference counter 107A is equal to zero (322).

When local reference counter 107A is not equal to zero ("NO" 322), consumer thread 27A may continue to receive references to immutable objects, manage the references, and process the references in the manner described above (302-318, as shown in the example of FIG. 6A). Responsive to determining that local reference counter 107A is equal to zero ("YES" 322), consumer thread 27A may generate a notification 110A that includes the value of hold reference counter 105A (324) and send notification 110A to producer thread 26 (326), which processes notification 110A as discussed in more detail above. Consumer thread 27A may then delete reference 104A from local object cache 102A, and delete local reference counter 107A and hold reference counter 105A (328). Consumer thread 27A may continue to receive references to immutable objects, manage the references, and process the references in the manner described above (302-318, as shown in the example of FIG. 6A, and 320-328, as shown in the example of FIG. 6B).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
instantiating, by a producer thread of a multi-threaded process executed by one or more processors of a computing device, an immutable object required by at least two consumer threads of the multi-threaded process;
providing, by the producer thread and to a first consumer thread of the at least two consumer threads, a reference to the immutable object;
determining, by the first consumer thread, whether the reference to the immutable object is already present in a local cache for the first consumer thread;
instantiating, by the first consumer thread and responsive to determining that the reference to the immutable object is not already present in the local cache, a hold reference counter and a local reference counter, and incrementing of the hold reference counter and the local reference counter by one;

incrementing, by the producer thread and responsive to providing the reference to the immutable object, a reference counter by one to record ownership of the immutable object by the first consumer thread, wherein the reference counter is local to the producer thread and inaccessible to the at least two consumer threads;

receiving, by the producer thread and from the first consumer thread, a notification that the first consumer thread has finished processing the immutable object in response to determining to send the notification;

decrementing, by the producer thread and responsive to receiving the notification, the reference counter by one; and deleting, by the producer thread and based on the reference counter, the immutable object.

2. The method of claim 1,
wherein the multi-threaded process comprises a route processing process that conforms to a routing protocol,
wherein the immutable object identifies routing information stored to a routing information base, and
wherein the computing device comprises a network router.

3. The method of claim 2, wherein the routing protocol comprises a border gateway protocol.

4. The method of claim 2,
wherein the routing information base is split into two or more routing information base partitions that are maintained by a corresponding route processing thread of two or more route processing threads,
wherein the two or more route processing threads operate as the producer thread and
wherein providing the reference to the immutable object comprises providing, to one or more of border gateway protocol update threads programmed to operate as the at least two consumer threads, the reference to the immutable object.

5. The method of claim 1, wherein deleting the immutable object comprises:
determining, responsive to decrementing the reference counter, whether the reference counter is equal to zero; and
deleting, responsive to determining that the reference counter is equal to zero, the immutable object.

6. The method of claim 1, further comprising:
decrementing, by the first consumer thread and responsive to determining that processing of the reference by the first consumer thread has finished, the local reference counter associated with the reference to the immutable object by one; and
determining, by the first consumer thread and based on the local reference counter, whether to send the notification to the producer thread.

7. The method of claim 6, wherein determining whether to send the notification to the producer thread comprises:
determining whether the local reference counter equals zero; and
determining, when the local reference counter equals zero, to send the notification to the producer thread.

8. The method of claim 1,
wherein the notification includes the hold reference counter maintained by the first consumer thread to indicate a number of times the reference was provided to the first consumer thread from the time of instantiation of the immutable object, and
wherein decrementing the reference counter comprises decrementing, based on the hold reference counter, the reference counter.

9. The method of claim 1, wherein providing the reference to the immutable object comprises providing, to the first consumer thread and without utilizing a lock on the immutable object, the reference to the immutable object.

10. A device comprising:
one or more processors configured to execute a multi-threaded process including a producer thread and a first consumer thread,
wherein the producer thread is programmed to:
instantiate an immutable object; and
provide, to the first consumer thread, a reference to the immutable object required by at least two consumer threads of the multi-threaded process, wherein the at least two consumer threads includes the first consumer thread,
wherein the first consumer thread is programmed to:
determine whether the reference to the immutable object is already present in a local cache for the first consumer thread;
instantiate, responsive to determining that the reference to the immutable object is not already present in the local cache, a hold reference counter and a local reference counter, and increment each of the hold reference counter and the local reference counter by one, and
wherein the producer thread is further programmed to:
increment a reference counter by one to indicate that the reference to the immutable object has been provided to the first consumer thread, wherein the reference counter is local to the producer thread and inaccessible to the at least two consumer threads;
receive, from the first consumer thread, a notification that the first consumer thread has finished processing the immutable object in response to determining to send the notification;
decrement, responsive to receiving the notification, the reference counter by one; and
delete, based on the reference counter, the immutable object.

11. The device of claim 10,
wherein the multi-threaded process comprises a route processing process that conforms to a routing protocol,
wherein the immutable object identifies routing information stored to a routing information base, and
wherein the device comprises a network router.

12. The device of claim 11, wherein the routing protocol comprises a border gateway protocol.

13. The device of claim 11,
wherein the routing information base is split into two or more routing information base partitions that are maintained by a corresponding route processing thread of two or more route processing threads,
wherein the route processing thread is programmed to operate as the producer thread and provide, to a border gateway protocol update thread programed to operate as one of the at least two consumer threads, the reference to the immutable object.

14. The device of claim 10, wherein the producer thread is programmed to:
determine, responsive to decrementing the reference counter, whether the reference counter is equal to zero; and
delete, responsive to determining that the reference counter is equal to zero, the immutable object.

15. The device of claim 10, wherein the first consumer thread is programmed to:

decrement, responsive to determining that processing of the reference by the first consumer thread has finished, the local reference counter associated with the reference to the immutable object by one; and determine, based on the local reference counter, whether to send the notification to the producer thread.

16. A non-transitory computer-readable storage medium having stored thereon instructions that, when executed, cause one or more processors to execute a producer thread of a multi-threaded process, the producer thread programmed to:

instantiate an immutable object;

provide, to a first consumer thread of the multi-threaded process, a reference to the immutable object, wherein the first consumer thread is programmed to:

determine whether the reference to the immutable object is already present in a local cache for the first consumer thread, and instantiate, responsive to determining that the reference to the immutable object is not already present in the local cache, a hold reference counter and a local reference counter by one; and increment each of the hold reference counter and the local reference counter by one;

increment, responsive to providing the reference to the immutable object, a reference counter by one to record ownership of the immutable object by the first consumer thread, wherein the reference counter is local to the producer thread and inaccessible to the at least two consumer threads;

receive, from the first consumer thread, a notification that the first consumer thread has finished processing the immutable object in response to determining to send the notification;

decrement, responsive to receiving the notification, the reference counter by one; and delete, based on the reference counter, the immutable object.

\* \* \* \* \*

UNITED STATES PATENT AND TRADEMARK OFFICE
CERTIFICATE OF CORRECTION

| | |
|---|---|
| PATENT NO. | : 11,561,823 B1 |
| APPLICATION NO. | : 15/930171 |
| DATED | : January 24, 2023 |
| INVENTOR(S) | : Jaihari V. Loganathan, Ashutosh K. Grewal and Sanjay Khanna |

Page 1 of 1

It is certified that error appears in the above-identified patent and that said Letters Patent is hereby corrected as shown below:

In the Claims

Column 18, Line 66 (Claim 1): Replace "incrementing of the hold reference counter" with -- incrementing each of the hold reference counter --.

Signed and Sealed this
First Day of April, 2025

Coke Morgan Stewart
*Acting Director of the United States Patent and Trademark Office*